July 3, 1951  G. E. FORD  2,558,743
THERMOMETER
Filed June 12, 1945
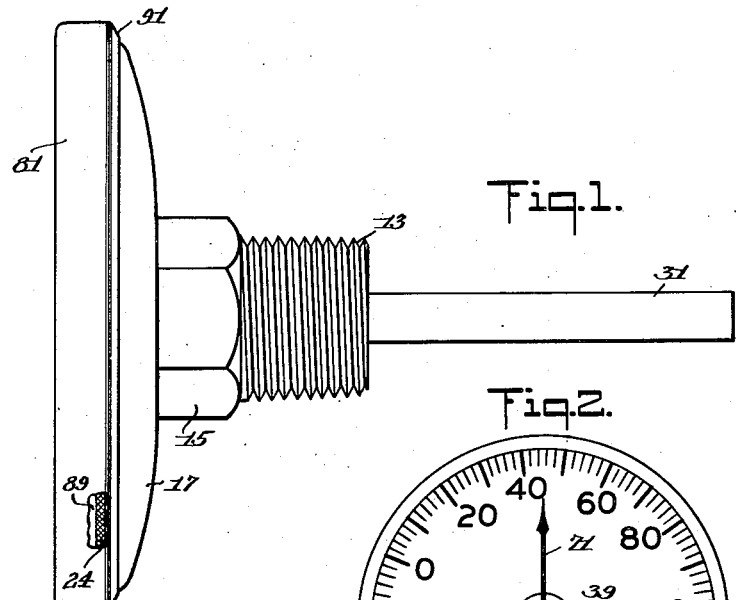
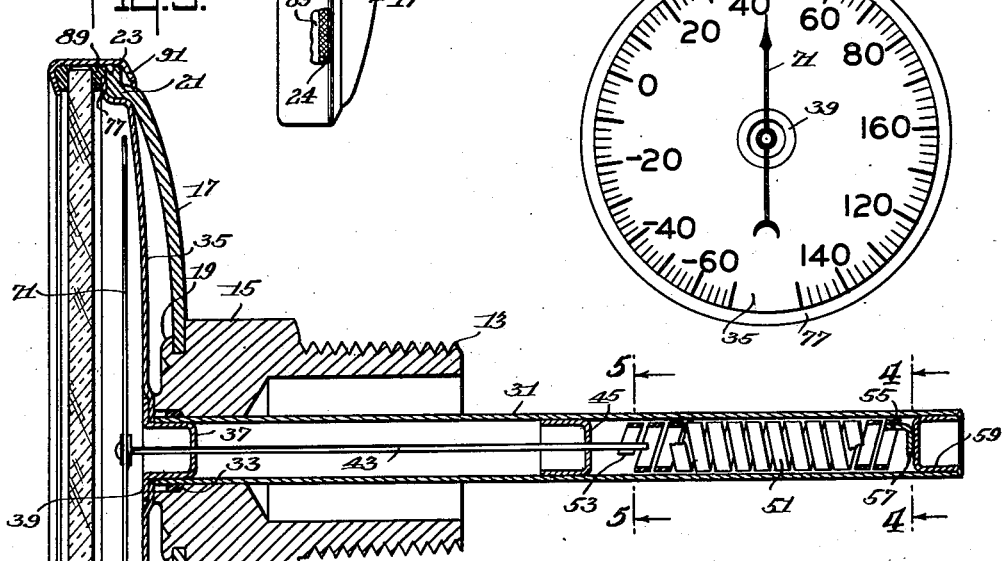
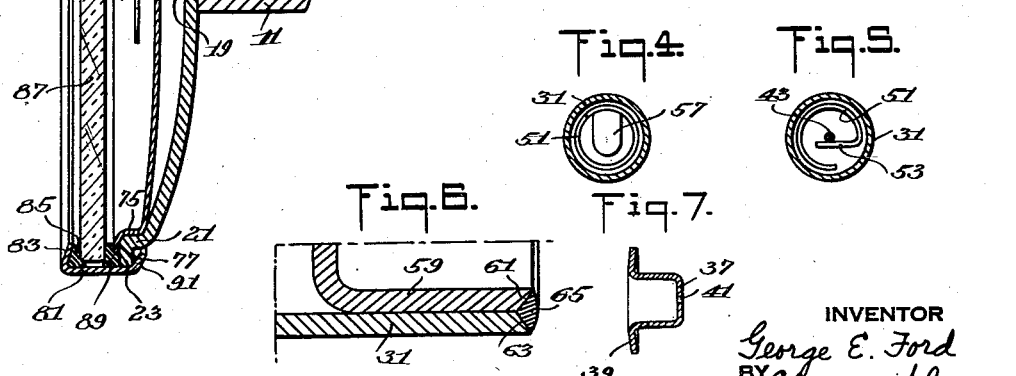
INVENTOR
George E. Ford
BY Charles Shepard
ATTORNEY Patented July 3, 1951

2,558,743

UNITED STATES PATENT OFFICE 2,558,743

THERMOMETER

George E. Ford, Brighton, N. Y., assignor to Qualitrol Corporation, East Rochester, N. Y., a corporation of New York Application June 12, 1945, Serial No. 599,051

8 Claims. (Cl. 73—367)

This invention relates to a thermometer, and particularly to one of the type in which the heat responsive element is a strip of bi-metallic material of helical shape.

An object of the invention is the provision of a generally improved and more satisfactory thermometer of this type.

Another object is the provision of a thermometer of this type which is easier and less expensive to construct than prior thermometers of the same general type.

Still another object is the provision of a thermometer or other indicating instrument of the dial and pointer type, having an improved arrangement permitting easy orientation of the dial relative to the casing, to calibrate the thermometer, while holding the dial firmly against accidental shifting relative to the casing, after calibration has been completed.

A further object is the provision of a thermometer or similar indicating instrument having improved means for sealing the instrument against entrance of dirt and moisture.

A further object is the provision of a thermometer made mainly from thin metal stampings so that heat is conducted quickly to the operating parts of the thermometer, as distinguished from thermometers of thick metal parts which absorb a substantial amount of heat and slow down the response to temperature changes.

A still further object is the provision of a thermometer of improved and streamlined appearance, so designed that it may be manufactured mainly of thin metal stampings without detracting from the appearance.

A still further object is the provision of a thermometer so designed that all soldering is in open or accessible positions, so that the soldering flux may be easily removed by washing or otherwise, preventing the corrosion which may occur when soldering is performed in "blind" or inaccessible positions.

These and other desirable objects are accomplished by the construction disclosed as an illustrative embodiment of the invention in the following description and in the accompanying drawings forming a part hereof, in which:

Fig. 1 is a side elevation of a thermometer constructed in accordance with a preferred embodiment of the present invention;

Fig. 2 is a face view of the dial of the thermometer;

Fig. 3 is a longitudinal section taken centrally through the thermometer of Fig. 1;

Fig. 4 is a transverse section taken substantially on the line 4—4 of Fig. 3;

Fig. 5 is a transverse section taken substantially on the line 5—5 of Fig. 3;

Fig. 6 is a longitudinal section through a fragment of the rear end of the thermometer on a larger scale than Fig. 3, illustrating additional details; and Fig. 7 is a longitudinal section taken centrally through a bearing and retaining member forming part of the thermometer.

The same reference numerals throughout the several views indicate the same parts.

The thermometer of the present invention is intended as a general utility or all-purpose thermometer, for use in indicating the temperature or air or other gas or liquid surrounding the thermometer stem, or of metal in conductive contact with the thermometer stem. It comprises a mounting member 11 of tubular form as indicated in Fig. 3, which mounting member may be provided externally with suitable attaching means such as a conventional union-type coupling nut, or such as the pipe threads 13 which may be screwed into a tapped opening in any suitable supporting wall, such as a container the temperature of the contents of which is to be measured. A hexagonal nut portion 15 on the mounting member 11 may be grasped by a wrench in order to screw the threads 13 tightly into the mounting opening.

This mounting member 11 has mounted on it the main casing 17 of the instrument, preferably in the form of a dished annular disk secured to the member 11 both by solder and by a staking operation performed on a shoulder on the member 11 as indicated at 19. The casing 17 curves forwardly, as best seen in Fig. 3, until a point near its outer edge is reached, when there is an abrupt forward step 21 and then a second abrupt bend providing a flange 23 extending radially outwardly with its front face lying substantially in a plane. It will be understood that the outline of the casing 17 is circular. The outer or peripheral edge of the terminal flange 23 is knurled or milled so as to be held more firmly by the bezel, as will be mentioned later, and as indicated at 24 in Fig. 1.

The passageway through the mounting member 11 is counterbored from both ends, as seen in Fig. 3, with a portion of largest diameter at the rear of the member, then an intermediate portion of smallest diameter, and finally at the front a portion of intermediate diameter. The main tube or stem 31 of the thermometer is a metal tube fitting snugly in the smallest diameter bore of the mounting member 11 and extending forwardly through this mounting member and terminating in a forward edge which is flush with the forward edge of the mounting member 11. The tube 31 is secured firmly in the mounting member by solder 33 in the recess formed around the front end of the tube 31 by the intermediate diameter portion or front counterbored portion of the mounting member. It should be especially noted that at the time the tube 31 is inserted in and soldered to the mounting member 11, the position of the solder 33 is close to the exposed forward edges of the mounting member 11 and of the tube 31, so that the solder may be readily placed in position and the soldering operation may be readily controlled to produce a perfect joint, with much greater ease and assurance than is the case with the inaccessible or "blind" soldering employed in assembling certain prior thermometers. A great advantage of this accessible soldering is that the residual flux remaining near the solder (or even at some distance therefrom, due to vaporization and condensation of the flux) may be easily removed by wiping or washing after the soldering operation is finished, rather than remaining in place to cause ultimate corrosion of the parts. This is important in any event, but particularly important when one of the parts to be soldered is of stainless steel, since a very strong flux must then be used, with consequent increased danger of corrosion if any flux remains on the instrument.

A dial 35 lies within the casing 17 and is mounted on the forward end of a metal cup 37 which is pressed into the forward end of the tube 31, and which has a tight press fit therein. The dial has a central opening which makes a snug rotary fit on the exterior surface of the cup member 37, and is held thereon by the out-turned marginal flange 39 at the forward end of the cup, which fits in an annular depression or recess in the front face of the dial, as seen in Fig. 3, so that when the parts are in assembled relation, the front face of the out-turned flange 39 on the cup 37 is substantially flush with the front face of the dial adjacent to such out-turned flange. The cup 37 is pressed or drawn from sheet metal, and is initially formed with the flange 39 bent somewhat backwardly as seen in Fig. 7. In assembling the parts, the cup is pressed into the tube 31 with sufficient force to spring the flange 39 forwardly to a plane perpendicular to the axis of the tube 31, as seen in Fig. 3. The resilience of the metal from which the cup 37 is made constantly tends to restore the flange 39 to its inclined position shown in Fig. 7, thus frictionally gripping the dial 35 between the flange 39 and the forwardly projecting ring at the front of the mounting member 11, and frictionally tending to retain the dial 35 in any position in which it is set, while permitting it, by the application of reasonable force, to be turned on the cup 37 for purposes of calibration.

The cup 37 is provided with a small central hole 41 (Fig. 7) furnishing snug rotary bearing for the forward end of the needle shaft 43, the rear end of which has a similar snug rotary fit in a hole in a second metal cup 45 which may be identical with the cup 37 except for the omission of the out-turned flange 39. This cup 45 is pressed into the tube 31 with a tight press fit, and is located at a suitable intermediate position in the tube 31. In the specific construction shown in Fig. 3, the cup 45 is approximately midway of the length of the tube 31, but it could be closer to or farther from the rear end of the tube, depending upon the amount of space required by the bi-metallic operating element.

The temperature responsive element in the present thermometer is in the form of a bi-metallic strip 51 of helical shape. The forward end of the strip is bent approximately radially as indicated at 53 in Fig. 5, and is spot-welded to the shaft 43 near its rear end, and fairly close to the bearing cup 45, so that the bearing cup gives sufficient support to the rear end of the shaft 43 to hold the forward end of the bi-metallic member 51 properly and accurately centered in the tube 31 without binding on any side of the tube.

The rear end of the helical bi-metallic strip 51 is spot-welded to one leg 55 of an angular bracket of sheet metal, the other leg 57 of which is spot-welded to the bottom or transverse wall of a metal cup 59 which is pressed into the rear end of the tube 31 and which has a tight press fit therein. The cup 59 may be identical with the cup 45 except for the omission of the bearing hole through which the shaft extends, and except that preferably the rear edge of the cup 59 is chamfered as indicated at 61 (Fig. 6), and the rear edge of the tube 31 is likewise chamfered as indicated at 63, these two chamfered surfaces forming a pocket between them for better receiving a sealing ring 65 of solder to seal the rear end of the thermometer tightly. However, the chamfer 61 may be omitted if it is preferred to reverse the cup 59 in the end of the tube 31, so that the bottom of the cup will be at the extreme outer edge of the tube. All three of the cups 37, 45, and 59 are preferably formed from thin metal.

The forward end of the shaft 43 carries a pointer or needle 71 which sweeps over suitable graduations or markings on the dial 35, typical graduations being indicated in Fig. 2, although the range of graduations may, of course, be varied to suit the characteristics of the particular thermometer.

To assist in holding the dial 35 firmly in place against accidental rotation in the casing 17, the dial is preferably formed with a forwardly extending portion or step 75 lying just within the forward step or shoulder 21 of the casing, and terminating in an outwardly or radially extending marginal flange 77 which overlies the front face of the marginal flange 23 of the casing throughout approximately half of its width, as seen in Fig. 3, but does not extend all the way out to the periphery of the flange 23. To assist in frictionally holding the dial 35 in its calibrated position during assembly of other parts, the dial is preferably formed of such dimensions that the marginal flange 77 presses rearwardly with considerable force on the flange 23 of the casing, when the center of the dial has been properly mounted in final position on the cup 37. Thus rotation of the dial (for calibration purposes) can be accomplished by the exertion of adequate force by means of a spanner wrench or other suitable tool, but such rotation is resisted and accidental rotation is practically precluded, by the frictional contact of the marginal flange 77 of the dial against the front of the flange 23 of the casing 17, and by the tight resilient frictional gripping of the dial near its center, by the flange 39 of the cup 37. These two separate frictional impediments to turning the dial are found in practice to be extremely effective in preventing accidental turning after the dial has been set in proper calibrated position and during subsequent assembly operations, while at the same time they do not interfere undesirably with the calibrating movements.

A bezel 81 fits over the periphery of the casing 17 and has an inwardly dished front flange 83 retaining a sealing ring 85 of resilient material such as natural or synthetic rubber, behind which is a transparent closure plate 87 such as a sheet of glass or of plastic transparent material, and behind the transparent member there is, in turn, a second sealing ring 89 likewise of resilient material similar to the ring 85. This sealing ring 89 rests partly on the front face of the marginal flange 23 of the casing, and partly on the front face of the marginal flange 77 of the dial, as plainly shown in Fig. 3. In assembling the parts (after the dial 35 has been rotated to calibrate or orient it to the proper position relative to the needle 71) the bezel 81, with the sealing rings 85 and 89 and the transparent plate 87 mounted in the bezel, is pressed over the marginal flange 23 of the casing, and then by means of an arbor press or other similar press, a beveled ring is pressed tightly against the rear portion of the bezel and forces the rear portion thereof inwardly, bending it downwardly as indicated at 91, to hold the bezel firmly in place on the casing, with the sealing rings 85 and 89 under tight compression. The forward step 21 of the casing 17 provides space in which the turned-over flange 91 of the bezel rests, so that in the final assembled position this turned-over flange 91 has its rear surface substantially tangent to the curved rear surface of the casing 17 and gives the appearance of being substantially a smooth outward continuation of the rear surface of the casing, so that a very neat and attractive appearance results. After the gasket 89 has been held under compression by the bezel for some time, it adheres quite firmly to the flange 77 of the dial and the flange 23 of the casing, as well as to the bezel, thus holding the dial quite firmly against rotation relative to the casing and bezel.

Although the hexagonal nut portion 15 is intended to be grasped by a wrench for screwing the threads 13 into the opening in which the thermometer is mounted, it is found in practice that there is a strong tendency for the mechanic to grasp the bezel 81 and apply rotary force to the bezel when mounting or detaching the thermometer. Unless special provision is made to resist this rotary force on the bezel 81, it may result in causing the bezel to slip circumferentially on the casing 17, and the rotation of the bezel may perhaps drag the dial 35 around with it, thus destroying the proper calibration of the thermometer and resulting in an inaccurate reading. To avoid this, it is one of the features of the present invention to make the outer edge of the flange 23 of the casing of knurled, milled, or serrated form. It may be knurled by a conventional knurling tool providing angular or oblique knurling, or it may be made by a milling tool providing axial milling similar to the milling on the edge of a coin of denomination larger than five cents. The bezel 81 is made of such dimensions as to be a relatively tight fit over the edge of the flange 23 of the casing, when initially thrusting the bezel onto the casing, and moreover the clinching operation whereby the rear edge of the bezel is bent over as at 91, results in a radially inward force on the bezel, all of which causes the bezel to bite into the knurling, milling, or serrations on the periphery of the casing flange 23, with the result that the bezel is firmly locked against rotation relative to the casing, by the application of any reasonable or ordinary rotary force.

Many of the advantageous features of the present construction have been specifically pointed out above, or will be obvious to those skilled in the art from the foregoing description. It may be appropriate to mention specifically, however, that one of the advantages of the described construction is its ease and cheapness of manufacture. The three cups 37, 45, and 59 mounted within the tube 31 may all be formed from the same die, the flanging operation used in making the cup 37 simply being omitted when making the cups 45 and 59, or the flange, if formed, may be easily trimmed off. The bearing hole may be readily punched through the bottom of the cups 37 and 45, and may be omitted when making the cup 59. The thermometer is particularly sensitive and quick to respond to temperature changes, as compared with many of the prior thermometers of the same general type, because the temperature responsive element 51 is enclosed only by relatively thin sheet metal parts, requiring no great amount of heat absorption before the heat is transmitted through the enclosing parts to the heat responsive element. The cups 37, 45, and 59 are much less expensive, as well as providing better heat transmission, than screw machine parts formed from solid rod. Because the heat responsive element is rigidly held at its rear end by the bracket 55, and is held at its forward end on the accurately centered shaft 43 held in turn by the bearing cup 45, it follows that the clearance between the bi-metallic element 51 and the surrounding tube 31 can be relatively small, without danger of contacting with and binding on the inner surface of the tube 31. Since all soldering is readily accessible, perfect soldered joints can be readily obtained and all residual flux may be removed, obviating corrosion due to flux residue remaining on the parts.

The instrument is particularly satisfactory from the standpoint of sealing it against entrance of dirt or moisture. The rear end of the tube 31 is completely sealed by the cup 59 having not only a tight press fit in the tube, but also a soldered joint 65. The front end of the tube 31 is sealed to the mounting member 11 both by a press fit and by the soldered joint 33. The mounting member 11 is sealed to the casing 17 by a soldered joint as above described, and the casing 17 is sealed to the transparent closure 87 by the resilient sealing ring 89 maintained under tight compression. The sealing ring 89 contacts not only with the casing 17, but also with the outer edge of the dial 35, and thus assists the frictional forces previously described in holding the dial immovably in the casing, preventing any twisting or rotation thereof which might throw the dial out of proper calibration relative to the needle 71. Moreover, the contact between the sealing ring 89 and the casing is not a mere thin edge contact, as in some prior constructions, but is a large-area contact over an adequately wide surface of the casing, so that tight and permanent sealing is assured.

It is seen from the foregoing disclosure that a construction is provided which admirably fulfills the above-mentioned objects of the invention. It is to be understood that the foregoing disclosure is given by way of illustrative example only, rather than by way of limitation, and that without departing from the invention, the construction may be varied within the scope of the appended claims. It is also seen that many of the constructional features are not limited in their usefulness to a thermometer, but may be advantageously employed in various other indicating instruments such as pressure gauges, liquid level gauges, or the like.

What is claimed is:

1. A thermometer including a mounting member having a bore therethrough, a casing secured to said mounting member adjacent the front end thereof, a tube projecting rearwardly from said mounting member and extending through the bore in said mounting member substantially to the front end of said mounting member, a formed sheet metal cup-shaped member mounted in the front end of said tube with its side walls pressed tightly into said tube and projecting forwardly beyond the front end of said tube and with its bottom extending transversely across said tube inwardly from the front end of said tube, a dial mounted on said forwardly projecting side walls of said cup-shaped member, a pointer cooperating with said dial, a shaft connected to said pointer and extending rearwardly therefrom through said tube and having a bearing in said cup-shaped member, and a bi-metallic heat responsive element located within the rearwardly projecting portion of said tube and operatively connected to said shaft.

2. A construction as described in claim 1, in which said cup-shaped member is made of resilient material and has a flange overlying the front of said dial and resiliently pressing rearwardly thereon to tend to hold said dial against rotation on said cup-shaped member.

3. A thermometer including a mounting member, a casing secured to said mounting member adjacent the front end thereof, a tube secured to said mounting member and projecting rearwardly therefrom, a bi-metallic heat responsive element within said tube, a closure for the rear end of said tube comprising a cup-shaped member fitted within said tube and having rearwardly extending side walls, the rear edges of said side walls and the rear edges of said tube being chamfered obliquely to form a valley between them, and solder in said valley for sealing said cup-shaped member to said tube.

4. A thermometer including a mounting member having a bore therethrough, said bore being enlarged at its front end, a tube projecting rearwardly from said mounting member and extending forwardly through said bore to the enlarged portion thereof, solder surrounding said tube in said enlarged portion to seal said tube to said mounting member, a casing secured to said mounting member adjacent the forward end thereof, a bi-metallic heat responsive element mounted within the rearwardly projecting portion of said tube, a shaft operatively connected to said heat responsive element and extending forwardly therefrom through said tube to said casing, and a pointer mounted on said shaft and movable within said casing.

5. A construction as described in claim 4 further including two stamped sheet metal cup-shaped members fitting within the portion of said tube through which said shaft extends and providing bearings for said shaft at two spaced points thereof.

6. An indicating instrument including a tubular member, a formed sheet metal member having a cylindrical portion having a tight press fit within said tubular member and projecting from one end of said tubular member, a dial plate having an opening surrounding and mounted on the projecting end of said cylindrical portion, and a flange on said cylindrical portion for overlying a portion of said dial plate around said opening to retain said dial plate on said cylindrical portion, said flange being resilient and serving to press resiliently on said dial plate in a direction toward said tubular member.

7. An indicating instrument including a casing having an approximately flat marginal flange lying substantially in a flat plane and terminating in a substantially cylindrical edge of the same width as the thickness of said flat marginal flange, said cylindrical edge being serrated, a dial plate having a marginal portion overlying part but not all of the width of said marginal flange of the casing, a transparent closure spaced from said dial plate, a sealing gasket interposed between said transparent closure and said marginal flange and lying in tight contact both with said marginal flange and with the marginal portion of said dial plate, and a bezel holding said transparent closure and sealing gasket in place, said bezel having an inwardly bent flange lying behind said marginal flange of said casing and tightly engaging said serrated peripheral edge of said casing especially at the rear corner thereof to resist rotation of said bezel relative to said casing.

8. An indicating instrument including a mounting member having a bore therethrough, said bore being enlarged at its front end, said mounting member having a substantially flat front face surrounding said enlarged front end of said bore, a tube mounted in said bore and projecting rearwardly from said mounting member and extending forwardly to a front face substantially flush with said front face of said mounting member, solder surrounding said tube in said enlarged front end of said bore to seal said tube to said mounting member, a casing plate seated on and secured to said mounting member rearwardly of and radially outwardly from said flat front face of said mounting member, a dial plate mounted in front of said casing plate and having an opening alined with said tube, and a stamped sheet metal retaining member having a substantially cylindrical portion tightly pressed into the forward end of said tube and a resilient marginal flange extending radially outwardly from the forward end of said cylindrical portion and overlying said dial plate and resiliently pressing rearwardly on said dial plate to hold said dial plate seated against the forward end of said tube and also against said flat front face of said mounting member.

GEORGE E. FORD.

REFERENCES CITED

The following references are of record in the file of this patent:

UNITED STATES PATENTS

| Number | Name | Date |
|---|---|---|
| 1,787,327 | Schlaich | Dec. 30, 1930 |
| 1,933,801 | Hart | Nov. 7, 1933 |
| 1,991,553 | Hastings | Feb. 19, 1935 |
| 2,019,221 | Hastings | Oct. 29, 1935 |
| 2,028,969 | Dillon | Jan. 28, 1936 |
| 2,048,512 | Oakley | July 21, 1936 |
| 2,276,178 | Ford | Mar. 10, 1942 |
| 2,343,372 | Ford et al. | Mar. 7, 1944 |
| 2,365,487 | Murray | Dec. 19, 1944 |

FOREIGN PATENTS

| Number | Country | Date |
|---|---|---|
| 508,441 | Great Britain | June 30, 1939 |
| 559,288 | Great Britain | Feb. 11, 1944 |